United States Patent

[11] 3,627,083

[72] Inventors Hermann Seip
 Bad Vilbel;
 Erich Rabich, Sprendlingen, both of Germany
[21] Appl. No. 882,526
[22] Filed Dec. 5, 1969
[45] Patented Dec. 14, 1971
[73] Assignee International Telephone and Telegraph Corporation
 New York, N.Y.
[32] Priority Dec. 9, 1968
[33] Germany
[31] P 18 13 560.9

[54] DISC BRAKE ADJUSTING MECHANISM
 5 Claims, 2 Drawing Figs.
[52] U.S. Cl. .................................................. 188/71.8,
 188/196 BA
[51] Int. Cl. .................................................. F16d 65/56,
 F16d 55/18

[50] Field of Search ............................................ 188/71.8,
 71.9, 196 RR

[56] References Cited
 UNITED STATES PATENTS
 3,467,227  9/1969  Belart .......................... 188/196 RR Primary Examiner—Duane A. Reger
Attorneys—C. Cornell Remsen, Jr., Walter J. Baum and Paul W. Hemminger ABSTRACT: An improved automatic adjusting device for disc brakes which prevents damage to the adjusting device when the permissible actuator piston stroke is exceeded. The connection between the piston and the adjusting device is releasable when the axial force exceeds a predetermined limit. In the embodiment shown the connection is formed by a deformable ring mounted in facing grooves in the piston and adjusting parts so that the ring may be forced completely into one of the grooves to allow relative movement between the piston and the adjusting mechanism.

Patented Dec. 14, 1971

3,627,083

Inventors
Hermann Seip
Erich Rabich

By
Agent

DISC BRAKE ADJUSTING MECHANISM

BACKGROUND OF THE INVENTION

1. Field of the Invention

This invention relates to disc brakes and particularly to automatic adjusting devices for the actuator pistons in disc brakes.

2. Description of Prior Art

In prior automatic adjusting devices for pistons of disc brakes, the system will function normally as long as the piston stroke is limited to 1 to 2 mm., which is the usual wear on disc brake pads. If, however, the brake is actuated without the linings being assembled, as might happen when the linings are being replaced, there is no provision for additional movement and the adjusting device will be damaged when the permissible piston stroke is exceeded. Although the hydraulically operated piston will still be operable, it is usually necessary to replace the entire piston assembly if the adjusting mechanism is damaged.

SUMMARY OF THE INVENTION

It is an object of this invention to provide an automatic adjusting device for disc brake pistons in which the mechanism will not be damaged when the permissible piston stroke is exceeded during braking action.

The present invention achieves this object by providing a connection between the adjusting device and the piston which is releasable without damage when the axial force being transmitted exceeds a predetermined limit. The connection can be easily reestablished afterwards.

In the embodiment shown an annular groove is provided on the inner circumference of the piston and a matching groove is provided on the outer circumference of the adjusting device. A ring which is elastically deformable in a radial direction is inserted in the grooves to provide a releasable connection between the adjusting device and the piston. When the piston moves beyond the range of movement of the adjusting device, the ring is forced out of one groove and completely into the other so as to release the connection between the piston and the adjusting device and allow the piston to continue moving beyond the adjusting range without damage to the adjusting mechanism. A chamfer may be provided on either the edge of the groove in the piston which is remote from the brake lining, so that the ring is forced into the groove in the adjusting mechanism, or on the edge of the groove in the adjusting mechanism which is adjacent to the brake linings so that the ring is forced into the groove in the piston.

In the embodiment shown an adjusting nut is rotatable on an adjusting spindle which is nonrotatably mounted in the caliper housing. A sleeve which is axially slidable on the nut has a groove at an angle to the axis which engages a fixed radial pin in the nut to turn the nut in adjusting direction when a fixed clearance is exceeded. This embodiment is constructed in such a way that the nut has an abutment against which the sleeve abuts when the permissible adjusting stroke is exceeded.

DESCRIPTION OF THE PREFERRED EMBODIMENT

Figures 1, 2:
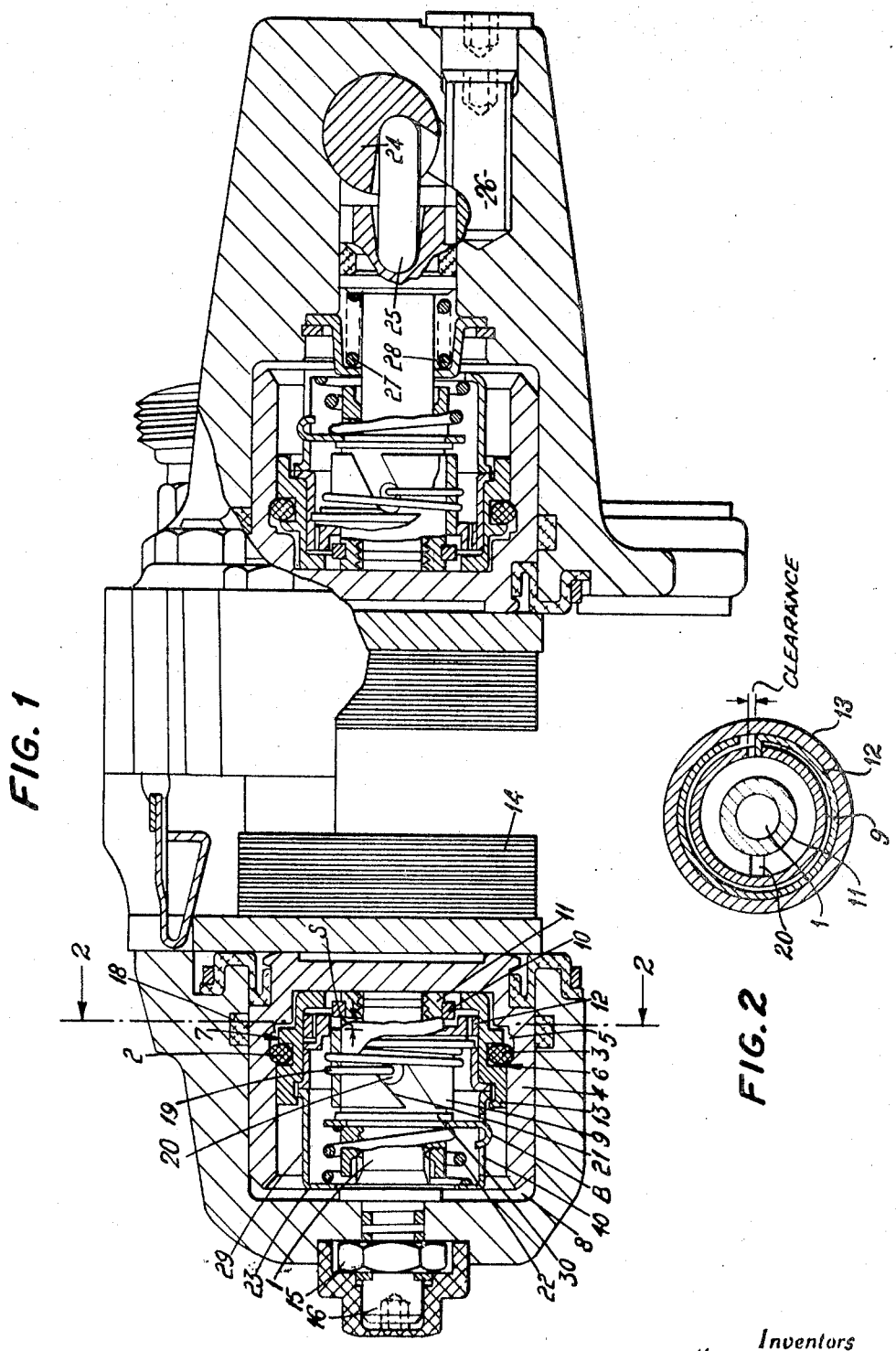
FIG. 1 shows a longitudinal cross-sectional view of a disc brake caliper assembly embodying the automatic clearance adjusting mechanism of the present invention.
FIG. 2 shows a transverse cross-sectional view of the automatic clearance adjustment mechanism taken along line 2—2 of FIG. 1.

Referring to FIGS. 1 and 2 there is shown a caliper housing consisting of two caliper halves, with an actuating cylinder 8 being provided in each half. In each cylinder a hollow piston 4 is arranged to slide in axial direction. When the brake is actuated hydraulic pressure acts upon the pistons 4 so that they move towards the brake disc, not shown, and press the brake linings 14 against the disc. The pistons are sealed by sealing rings 18 in the actuating cylinders.

The caliper assembly shown in the drawing is a hydraulically actuated fixed caliper having a mechanical hand brake mechanism on one side. However, the invention is not restricted to this type of caliper assembly and may be utilized in any adjusting arrangement in which the stroke must be limited for any reason. Although the caliper shown is hydraulically actuated, it will be apparent that the invention could be utilized in a mechanically or pneumatically operated brake.

An adjusting device according to the invention is arranged in each piston and consists of an adjusting spindle 1 which is mounted in the caliper housing so that the spindle will not rotate. A nut 11 is screwed on the adjusting spindle 1 and lies with one end against the inner front surface of the piston. A sleeve 9 slidable on the nut 11 has a slot 21 inclined at an angle to the axis which engages a radial pin 20 fixed to the nut 11. A helical spring 19 having one end anchored in the sleeve 9 keeps the pin 20 engaged with the area of the slot 21.

The nut 11 with the adjusting sleeve 9 arranged on it is surrounded by an outer part 13 of the adjusting device which lies with its outer circumferential surface against the inner circumferential surface of the hollow piston 4.

According to the invention there is a connection between this part 13 of the adjusting device and the piston 4 which can be released by a certain axial force and then be reestablished. In the illustrated embodiment this releasable connection between the adjusting device and the piston 4 is achieved by providing a groove 5 in the inner circumferential surface of the piston 4 and an opposite groove 2 in the part 13 of the adjusting device. A spring ring 3 which is elastically deformable in radial direction is arranged in the grooves.

Due to the radial tension of the ring 3, the adjusting device is kept free from play between the surface 6 and 7 of the grooves 5 and 2 in the piston 4.

The adjusting sleeve 9, slidably arranged on the nut 11, provides a collar on the end, facing the piston bottom, and a locking device engages on this collar.

In the illustrated embodiment this locking device becomes effective in radial direction and consists of a smooth spring band 12 whose one end is inserted into a groove of the adjusting sleeve 9 (see FIG. 2) and comes into frictional engagement on its outer periphery with the inner circumferential surface of the part 13 of the adjusting device when the sleeve 9 turns which is connected with the nut 11 by the pin-slot-spring assembly 20, 21, 19.

When the piston 4 is actuated by pressure (hydraulically, pneumatically or mechanically) the brake linings 14 are pressed against the brake disc after having overcome the clearance between the brake linings 14 and the brake disc against the force of the return springs 22 which bear against an abutment 23 provided on an extension 29 of the part 13 of the adjusting device. The other end of the return springs 22 bears against a disc 30 surrounding the nut 11.

The groove provided in the sleeve 9 to receive the end of the smooth spring band 12 is wider than the width of the spring end. The resulting gap determines the clearance between the brake lining 14 and the brake disc. When the linings wear down, the pistons 4 move beyond the distance which would correspond to the clearance and the sleeve 9 with the inclined slot 21 is blocked by the smooth spring band 12 and taken along by the piston via the part 13 of the adjusting device and the smooth spring band 12 resting against this part 13. Simultaneously, the nut 11 is turned on the adjusting spindle 1 via the pin 20. The adjusting step resulting therefrom is very small and does not correspond to the total displacement of the piston. The expansion of the caliper and the compression of the lining have practically no influence. In practice most braking actions operate with low pressure so that lining wear after each braking action is hardly measurable.

If, in a brake of this type which does not utilize the present invention, the brake is actuated without the brake linings being assembled, as might happen when the brake linings are being replaced, the permissible piston stroke or adjusting stroke is exceeded and the adjusting device damaged.

If for some reason the stroke in an adjusting device according to the invention is larger than the distance "s" between the end of sleeve 9 adjacent abutment 10 shown in the drawing, the sleeve butts against the abutment 10 of the nut 11. In this way the stroke of the adjusting device is limited and the adjusting device itself is blocked. When the pressure continues to rise, the ring 3 is radially deformed inwards over the chamfered edge 6 of the groove 5 of the piston 4 and enters into the groove 2 of the part 13. In this case the adjusting device is firmly connected with the housing and the piston 4 can freely slide out of the cylinder without damage the adjusting device.

As in any other wheel cylinder the piston can be pressed in again with very little effort. The ring 3 then snaps audibly and sensibly into the groove 5 of the piston 4.

In the embodiment illustrated, the edge of the groove 5 in the piston 4 which is remote from the brake lining is chamfered. Alternatively, the edge 7 of the groove 2 in the part 13 of the adjusting device could be chamfered. In this case the ring 3 would be pressed into the groove 5 of the piston 4 if excessive axial force is exerted on the piston.

By providing the adjusting device according to the invention with a releasable connection or coupling to the piston, damaging of the parts of the adjusting device under excessive pressure or by exceeding the adjusting stroke is precluded.

When the linings are worn and have to be replaced, the adjusting device is mechanically screwed back. Advantageously, this is done by a resetting device for the adjusting spindle 1 which can be operated outside the caliper housing. In the adjusting device illustrated on the left side of the drawing the adjusting spindle 1 has a hexagonal or square formed head 16 at one end with an outside screw thread on which a locking nut 15 is fitted. To bring the adjusting mechanism back to its initial position, the locking nut 15 is unscrewed, the adjusting spindle 1 is turned till the piston 4 reaches its final position and the locking nut 15 is then retightened.

In the adjusting device shown on the right side of the drawing a pinion 26 is arranged to turn in the caliper housing, but not to slide in axial direction. This pinion gears into a corresponding toothing at the end of the adjusting spindle.

A mechanical device for manual operation of the brakes is illustrated on the right side of the drawing. A connecting rod 25 is arranged between a recess in the end of the spindle 1 and an eccentric recess in the actuating shaft 24. When the shaft 24 is turned by means of a cable via an actuating lever attached to said shaft, the connecting rod 25 moves the adjusting spindle 1 in direction of the disc brake so that the brake linings 14 are brought into engagement with the brake disc by force of action or reaction. When the mechanical handbrake is released, the adjusting motion of the piston is intensified by a spring 28 which presses against a collar on the spindle 1 and on its other end bears against a flangelike part 27 mounted in the housing.

It will be appreciated that the invention illustrated and described herein may be modified by those skilled in the art without deviating from the spirit and scope of the invention as set forth in the following claims.

We claim as our invention:

1. A disc brake caliper having a piston movable in a cylinder toward and away from a disc, an automatic clearance adjusting mechanism disposed within the piston and means disposed between the inner surface of said piston and the outer surface of said adjusting mechanism to provide a releasable connection between the piston and adjusting mechanism is releasable to allow the piston to continue to move without damage to the adjusting mechanism when the axial force transmitted by the releasable connection exceeds a predetermined value and then automatically reestablishing said connection when said axial force is reduced below the predetermined value.

2. The disc brake caliper of claim 1 wherein; the piston is hollow and has an annular groove in its inner surface, the adjusting mechanism has an annular groove in its outer surface at the same position as the groove in the piston, a ring which is elastically deformable in a radial direction fits in the annular chamber formed by the grooves and the edge of one of the grooves is chamfered so that the ring will be forced into the other groove when the axial force being transmitted by the connection exceeds a predetermined value.

3. The disc brake caliper of claim 2 wherein the edge of the groove in the piston remote from the disc is chamfered so that the ring will be forced into the groove in the adjusting mechanism.

4. The disc brake caliper of claim 2 wherein the edge of the groove in the adjusting mechanism closest to the disc is chamfered so that the ring will be forced into the groove in the piston.

5. In a disc brake; a brake actuator piston movable in a cylinder toward and away from the disc, an adjusting device having a first part movable with the piston and a second part fixed to the cylinder, a releasable connection between the piston and the first part comprising an annular groove in the inner surface of the piston, an annular groove in the outer surface of the first part facing the groove in the piston, a chamfer on the edge of one of the grooves and an elastically deformable ring in the grooves, whereby the ring will be forced completely into one of the grooves when the axial force between the piston and the adjusting mechanism exceeds a predetermined value.

* * * * *